United States Patent
Chang (10) Patent No.: US 7,729,069 B2
(45) Date of Patent: Jun. 1, 2010

(54) LENS MODULE AND CAMERA MODULE HAVING SAME

(75) Inventor: Jen-Tsorng Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/146,861

(22) Filed: Jun. 26, 2008

(65) Prior Publication Data

US 2009/0147384 A1 Jun. 11, 2009

(30) Foreign Application Priority Data

Dec. 6, 2007 (CN) .......................... 2007 1 0202906

(51) Int. Cl.
*G02B 7/02* (2006.01)
(52) U.S. Cl. ....................... 359/824; 359/819
(58) Field of Classification Search ......... 359/813–814, 359/822–824, 819; 369/44.11, 44.14–44.16, 369/44.22, 44.28, 44.32; 348/208.99, 208.4–208.6; 396/72–88; *G02B 7/02*
See application file for complete search history.

(56) References Cited

U.S. PATENT DOCUMENTS

| | | | | |
|---|---|---|---|---|
| 4,555,780 A * | 11/1985 | Koide | ...................... | 369/44.16 |
| 4,592,037 A * | 5/1986 | Ohnuki | ...................... | 359/814 |
| 5,070,489 A * | 12/1991 | Perry et al. | ................... | 359/824 |
| 6,385,146 B1 * | 5/2002 | Choi et al. | ................... | 359/824 |
| 2006/0132936 A1 * | 6/2006 | Yu | ............................ | 359/824 |
| 2006/0245085 A1 * | 11/2006 | Lee et al. | ...................... | 359/813 |
| 2007/0053082 A1 * | 3/2007 | Sue et al. | ...................... | 359/819 |

* cited by examiner

*Primary Examiner*—Darryl J Collins
*Assistant Examiner*—Zachary Wilkes
(74) *Attorney, Agent, or Firm*—Andrew C. Cheng (57) ABSTRACT

An exemplary lens module includes a barrel, a lens received in the barrel, a movable coil unit, and a magnet. The movable coil unit includes a first coil and a plurality of resilient elements. The first coil is wound around a peripheral sidewall of the lens in a first winding direction. The first coil is mounted in the barrel. A first end of each of the resilient elements is connected to the first coil, and a second end of each of the resilient elements is mounted to an inner surface of the barrel. The first coil is movable along the optical axis, thus driving the lens to move along the optical axis. The magnet is received in the barrel and faces the first coil.

4 Claims, 9 Drawing Sheets

LENS MODULE AND CAMERA MODULE HAVING SAME

BACKGROUND

1. Technical Field

The present invention relates to the optical imaging field and, particularly, to a lens module and a camera module having the same.

2. Description of Related Art

With the development of the optical imaging technology, camera modules are widely used in a variety of portable electronic devices, such as mobile phones, and personal digital assistants (PDAs).

In a typical camera module, an actuator is employed to drive a lens (or a lens assembly) to move relative to an image sensor or another lens (or another lens assembly) in order to achieve auto-focusing or zooming. The actuator commonly includes a stepper motor and a drive circuitry. The drive circuitry, regulated by a control unit, can drive the stepper motor to perform a rotational movement. In order to adjust the position of the lens, a gear assembly has been employed to transform the rotational movement of the stepper motor into linear movement. However, the occurrence of backlash/recoil of the gear assembly may result in a degraded accuracy of the position adjustment.

Therefore, a new lens module and a new camera module are desired to overcome the above mentioned problems.

SUMMARY

An exemplary lens module includes a barrel, a lens received in the barrel, a movable coil unit, and a magnet. The lens has an optical axis. The movable coil unit includes a first coil and a plurality of resilient elements. The first coil is wound around a peripheral sidewall of the lens in a first winding direction. The first coil is mounted in the barrel. A first end of each of the resilient elements is connected to the first coil, and a second end of each of the resilient elements is coupled to an inner surface of the barrel. The first coil is movable along the optical axis, thus driving the lens to move along the optical axis. The magnet is received in the barrel and faces the first coil.

An exemplary camera module includes a barrel, a lens received in the barrel, a movable coil unit, a magnet, a holder, and an image sensor. The lens has an optical axis. The movable coil unit includes a first coil and a plurality of resilient elements. The first coil is wound around a peripheral sidewall of the lens in a first winding direction. The first coil is mounted in the barrel. A first end of each of the resilient elements is connected to the first coil, and a second end of each of the resilient elements is mounted to an inner surface of the barrel. The first coil is movable along the optical axis, thus driving the lens to move along the optical axis. The magnet is received in the barrel and faces the movable first coil. The holder is threadedly engaged with the barrel. The image sensor is accommodated in the holder and optically aligned with the first lens.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Embodiments will now be described in detail below with reference to the drawings.

Figure 1:
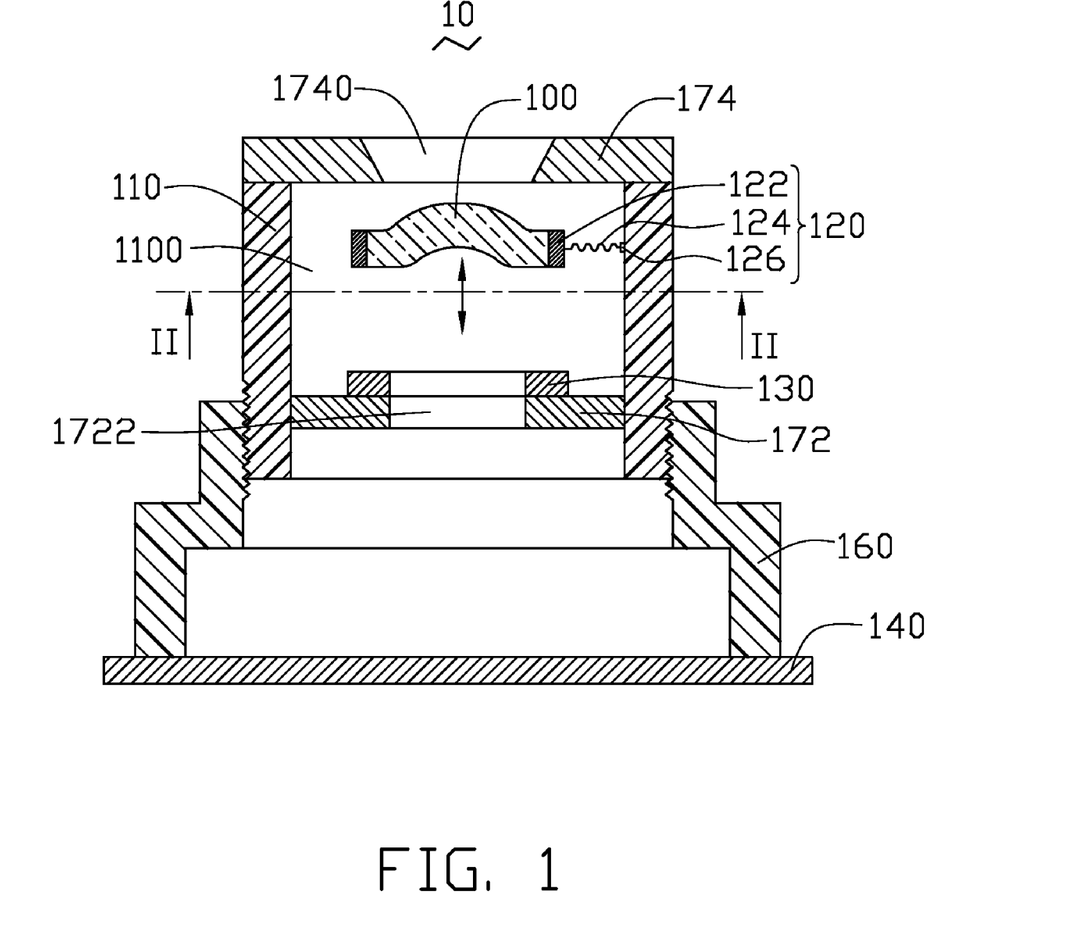
FIG. 1 is a schematic, side cross-sectional view of a lens module, according to a first embodiment.
Figure 2:
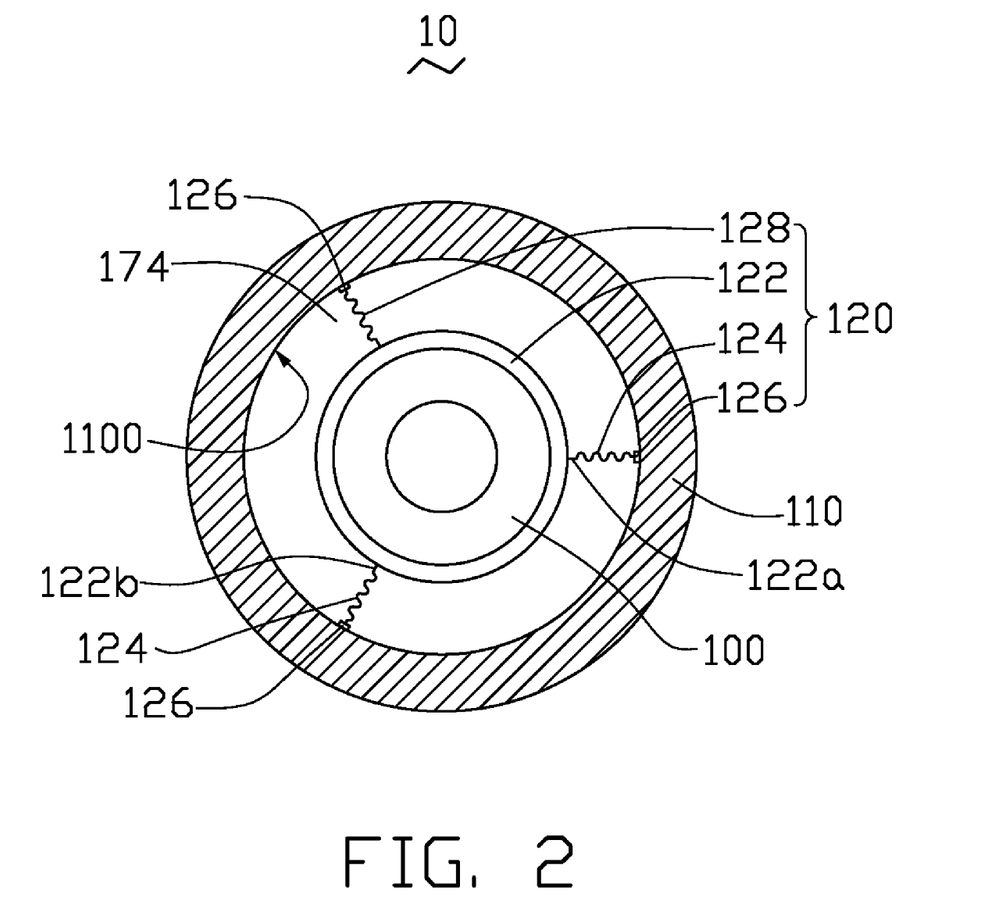
FIG. 2 is a schematic, side cross-sectional view of the lens module of FIG. 1, taken along the line of II-II.

Referring to FIGS. 1 and 2, a lens module 10 of a first embodiment is shown. The lens module includes a barrel 110, a lens 100 having an optical axis, a movable coil unit 120, a magnet 130, a holder 160, and a circuit board 140. The barrel 110 is threadedly coupled to the holder 160. The holder 160 is fixedly mounted on the circuit board 140. The lens 100, the movable coil unit 120, and the magnet 130 are received in the barrel 110.

The movable coil unit 120 includes a coil 122, two first resilient elements 124, and a second resilient element 128. The coil 122 is wound around the lens 100 and supports the lens 100. The first resilient elements 124 and the second resilient element 128 are made of metal, and have shapes of sine waves. The first resilient elements 124 and the second resilient element 128 are arranged along directions perpendicular to the optical axis of the lens 100, i.e., the first resilient elements 124 and the second resilient element 128 have resilient directions perpendicular to the optical axis of the lens 100. The first resilient elements 124 and the second resilient element 128 cooperatively support the coil 122. The coil 122 includes a first end 122a and a second end 122b. One resilient element 124 has an end connected to the first end 122a and another resilient element 124 has an end connected to the second end 122b of the coil 122. Second ends of the first resilient elements 124 are connected to an inner surface of a peripheral sidewall 1100 of the barrel 110 by an anchor 126. A first end of the second resilient elements 128 is connected to the coil 122, and a second end of the second resilient elements 128 is connected to the inner surface of the peripheral sidewall 1100 by the anchor 126. The first resilient elements 124 are conductive, and are electrically connected to the circuit board 140 by a wire (not shown). With this configuration, when the circuit board 140 supplies a voltage to the coil 122 through the first resilient elements 124, the coil 122 generates a magnetic field.

The magnet 130 can be a ring-shaped electromagnet. The magnet 130 is fixedly mounted in the barrel 110 and is opposite to the coil 122. Similarly, the magnet 130 can be connected to the circuit board 140 by a wire (not shown). When the circuit board 140 supplies a voltage to the magnet 130, the magnet 130 generates a magnetic field. The magnet 130 is mounted on a magnetoconductive metal plate 172 with a through hole 1722 defined in the magnetoconductive metal plate 172. The magnetoconductive metal plate 172 is fixed in the barrel 110, and on a side of the magnet 130 away from the movable coil unit 120. The magnetoconductive metal plate 172 prevents magnetic fields of the coil 122 and the magnet 130 from leaking out, accordingly avoiding electromagnetic interference on other electrical components, such as an image sensor (not shown), and so on. In order to further avoid electromagnetic interference on other electrical components, the lens module 10 further includes a magnetoconductive metal plate 174. The magnetoconductive metal plate 174 defines a tapering through hole 1740 therein, and the tapering hole 1740 allows light to pass into the barrel 110.

In operation, the circuit board 140 supplies voltages to the coil 122 and the magnet 130, then the coil 122 and the magnet 130 generate magnetic fields, thus attracting or repelling each other. When the magnet 130 attracts the coil 122, the coil 122 drives the lens 100 to move towards the magnet 130. When the lens 100 is away from its original position, the first resilient elements 124 and the second resilient element 128 are stretched away from the equilibrium position, and thus generating restoring forces. When no voltage is supplied to the coil 122 and the magnet 130, the restoring forces make the first resilient elements 124 and the second resilient element 128 to restore to the equilibrium positions. Accordingly, the first resilient elements 124 and the second resilient element 128 drive the coil 122 and the lens 100 to return to the original position.

Likewise, when the magnet 130 repels the coil 122, the coil 122 drives the lens to move away from the magnet 130. When no voltage is supplied to the coil 122 and the magnet 130, the first resilient elements 124 and the second resilient element 128 drive the coil 122 and the lens 100 to return to the original position. A moving direction of the lens 100 relative to the original position is controlled by the directions of the voltages applied to the coil 122 and the magnet 130. At the same time, a moving distance of the lens 100 relative to the original position can be precisely controlled by the magnitudes of the voltages supplied to the coil 122 and the magnet 130.

Figure 3:
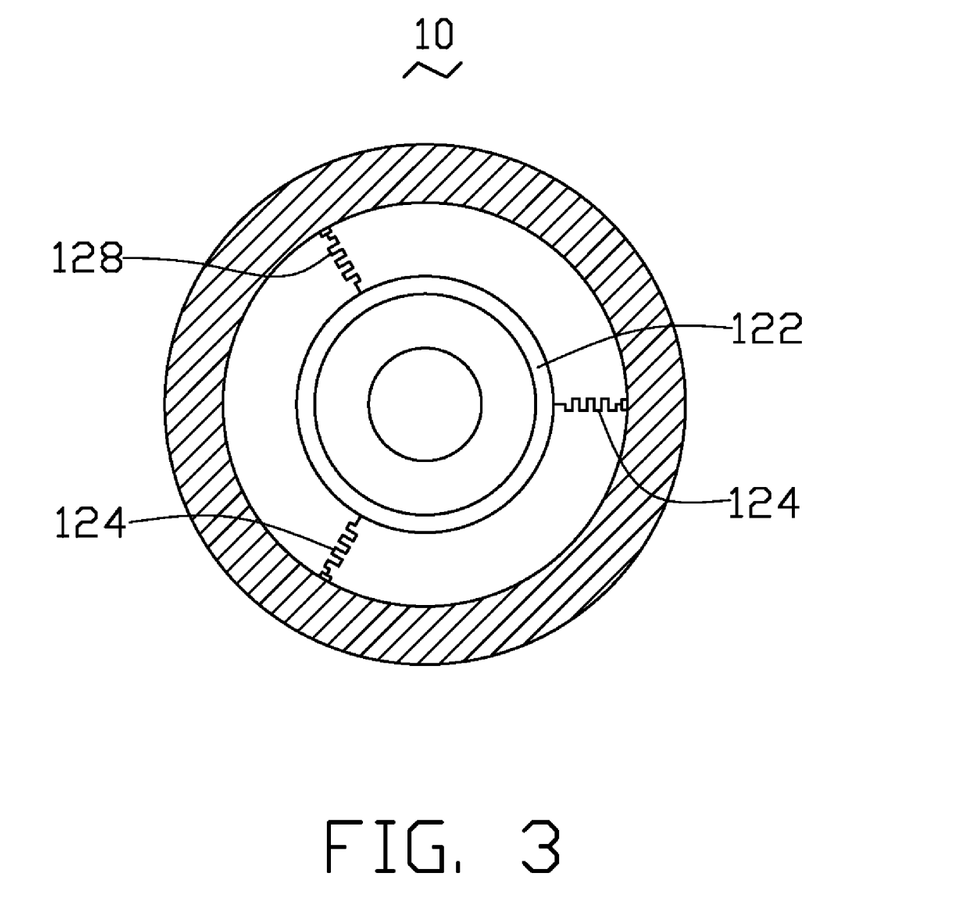
FIG. 3 is a schematic, side cross-sectional view of the lens module of FIG. 1 employing alternative resilient elements, taken along the line of II-II.
Figure 4:
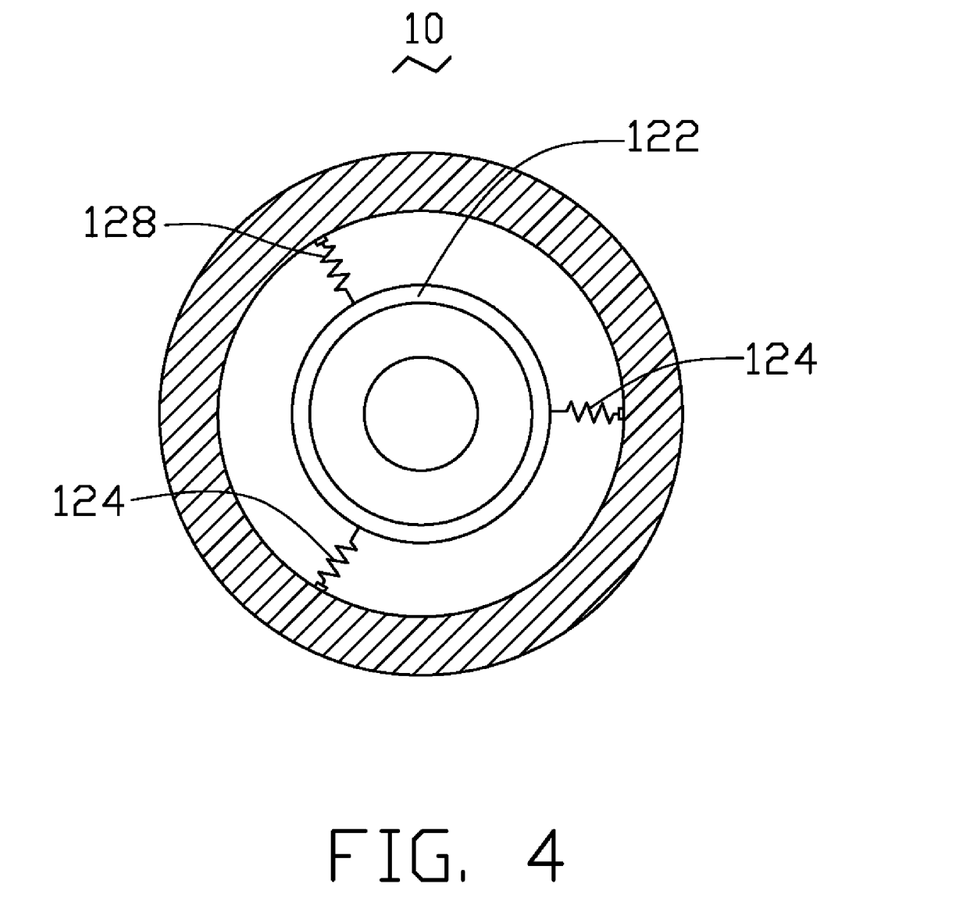
FIG. 4 is a schematic, side cross-sectional view of the lens module of FIG. 1 employing further alternative resilient elements, taken along the line of II.

In the above-mentioned embodiment, the first resilient elements 124 and the second resilient element 128 have shapes of sine waves. Alternatively, the first resilient elements 124 and the second resilient element 128 can have shapes such as square waves (see FIG. 3), triangular waves (see FIG. 4), and so on.

In the above-mentioned embodiment, no gear assembly is provided for adjusting the position of the lens 100. Thus, the problems caused by backlash/recoil of the gear assembly are eliminated. Accordingly, the position adjustment of the lens 100 can be precisely controlled.

Figure 5:
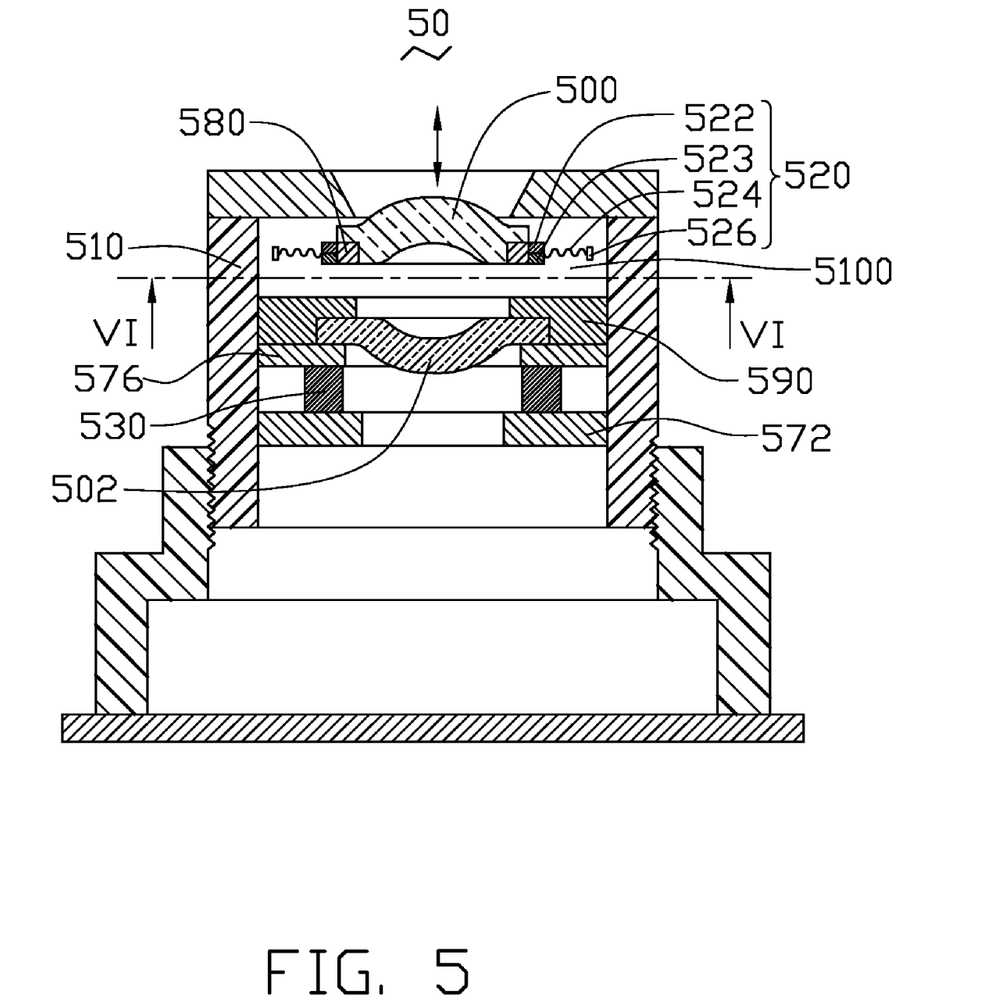
FIG. 5 is a schematic, side cross-sectional view of a lens module, according to a second embodiment.
Figure 6:
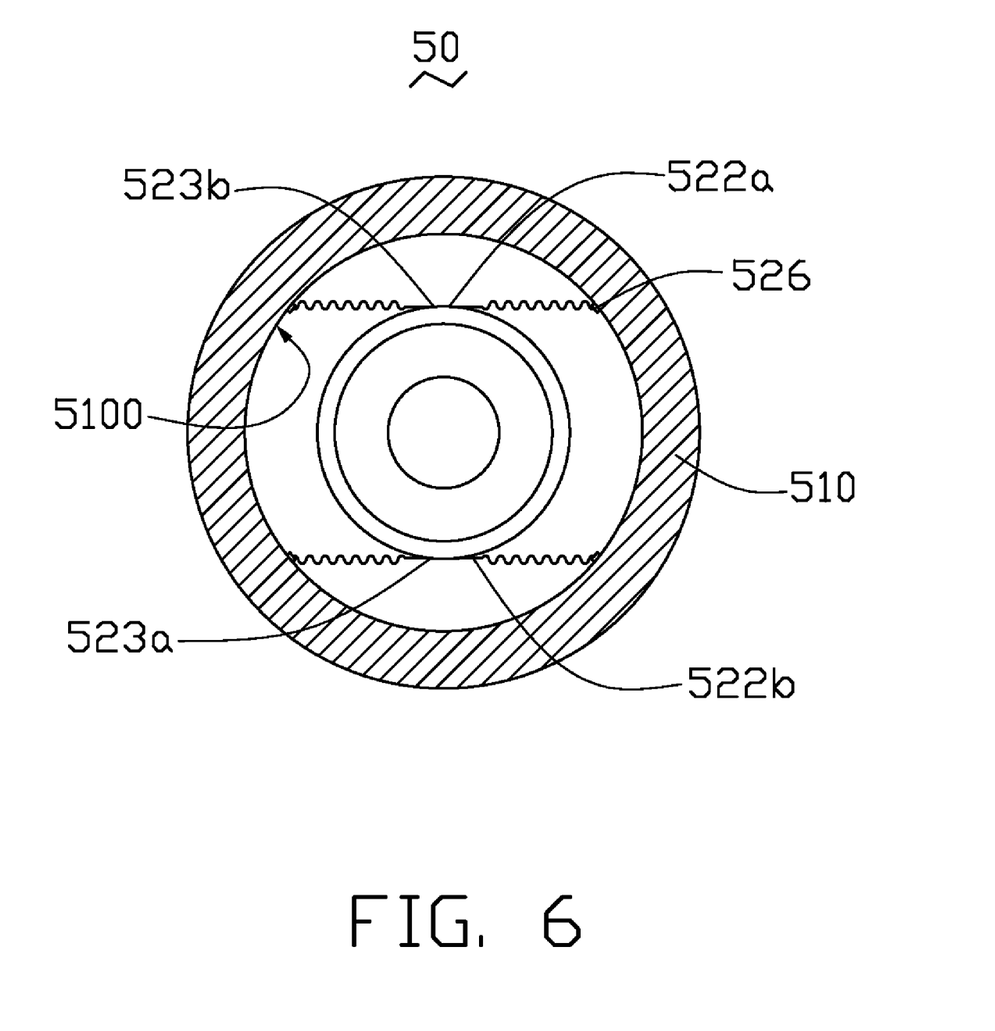
FIG. 6 is a schematic, side cross-sectional view of the lens module of FIG. 5, taken along the line of II-II.
Figure 7:
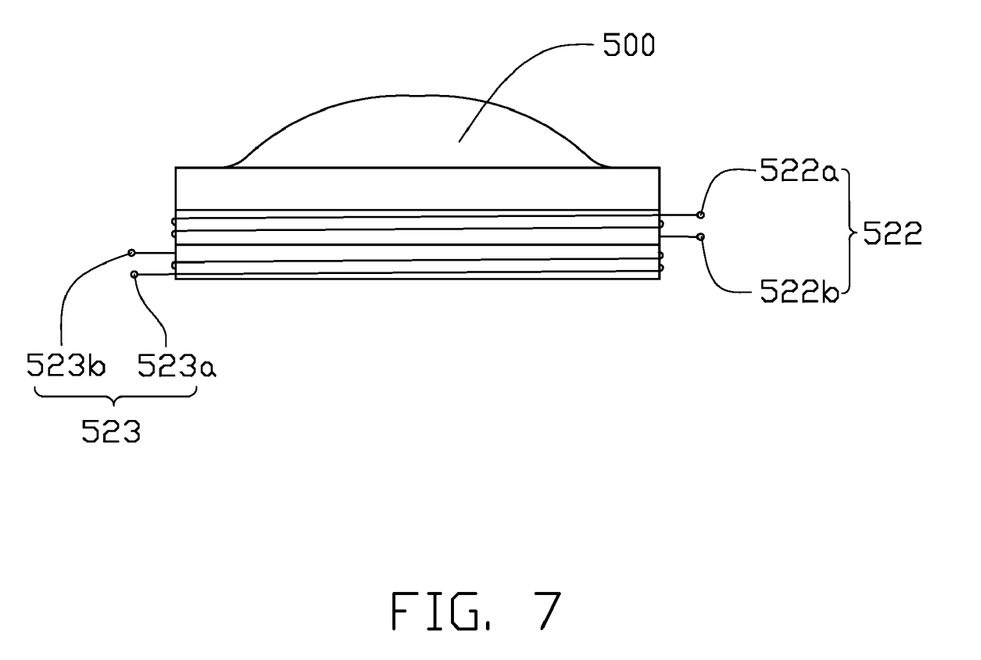
FIG. 7 is a schematic, side view of a lens, a metal ring surrounding the lens, a first coil, and a second coil wound around the metal ring in the lens module of FIG. 5.

Referring to FIGS. 5-7, a lens module 50 of a second embodiment is shown. The lens module 50 is similar to the lens module 10. The lens module 50 includes a barrel 510, a first lens 500, a metal ring 580, a movable coil unit 520 surrounding the metal ring 580, a second lens 502, a ring 590 accommodating the second lens 502 therein, a magnetoconductive metal plate 576, a magnet 530, and a magnetoconductive metal plate 572. The metal ring 580 surrounds a peripheral sidewall of the first lens 500 and secures the first lens 500 therein. The magnetoconductive metal plate 576 has a through hole (not labeled) defined therein and supports the second lens 502. Also, the magnetoconductive metal plate 572 has a through hole (not labeled) defined therein and supports the magnet 530.

The movable coil unit 520 includes a first coil 522, a second coil 523, and four resilient elements 524. The first coil 522 is wound around a side surface of the metal ring 580 in a first winding direction (e.g., the clockwise direction). The second coil 523 is wound around the side surface of the metal ring 580 in a second winding direction (e.g., the counterclockwise direction). The first coil 522 and the second coil 523 are mechanically mounted to the metal ring 580 using, for example, glue. The first coil 522 includes a first end 522a and a second end 522b configured for allowing a voltage to be applied therebetween. The second coil 523 includes a first end 523a and a second end 523b configured for allowing a voltage to be applied therebetween. Viewed from the first ends 522a, 523a to the second ends 522b, 523b, the second winding direction is the reversed first winding direction. The first ends 522a, 523a and the second ends 522b, 523b are connected to first ends of the respective resilient elements 524, and a second end of each of the resilient elements 524 is coupled to an anchor 526 on the inner surface 5100 of the barrel 510. In this way, the four resilient elements 524 cooperatively support the first lens 500.

In operation, when two identical voltages are applied between the two ends 522a, 522b of the first coil 522 and the two ends 523a, 523b of the second coil 523 through the respective resilient elements 524, a corresponding current would flow from the first end 522a to the second end 522b along the first winding direction, and another corresponding current would flow from the first end 523a to the second end 523b along the second winding direction, causing the first coil 522 and the second coil 523 to generate two substantially reversed magnetic fields. A moving direction of the first lens 500 can be controlled by selectively supplying a voltage to the first coil 522 or the second coil 523.

Figure 8:
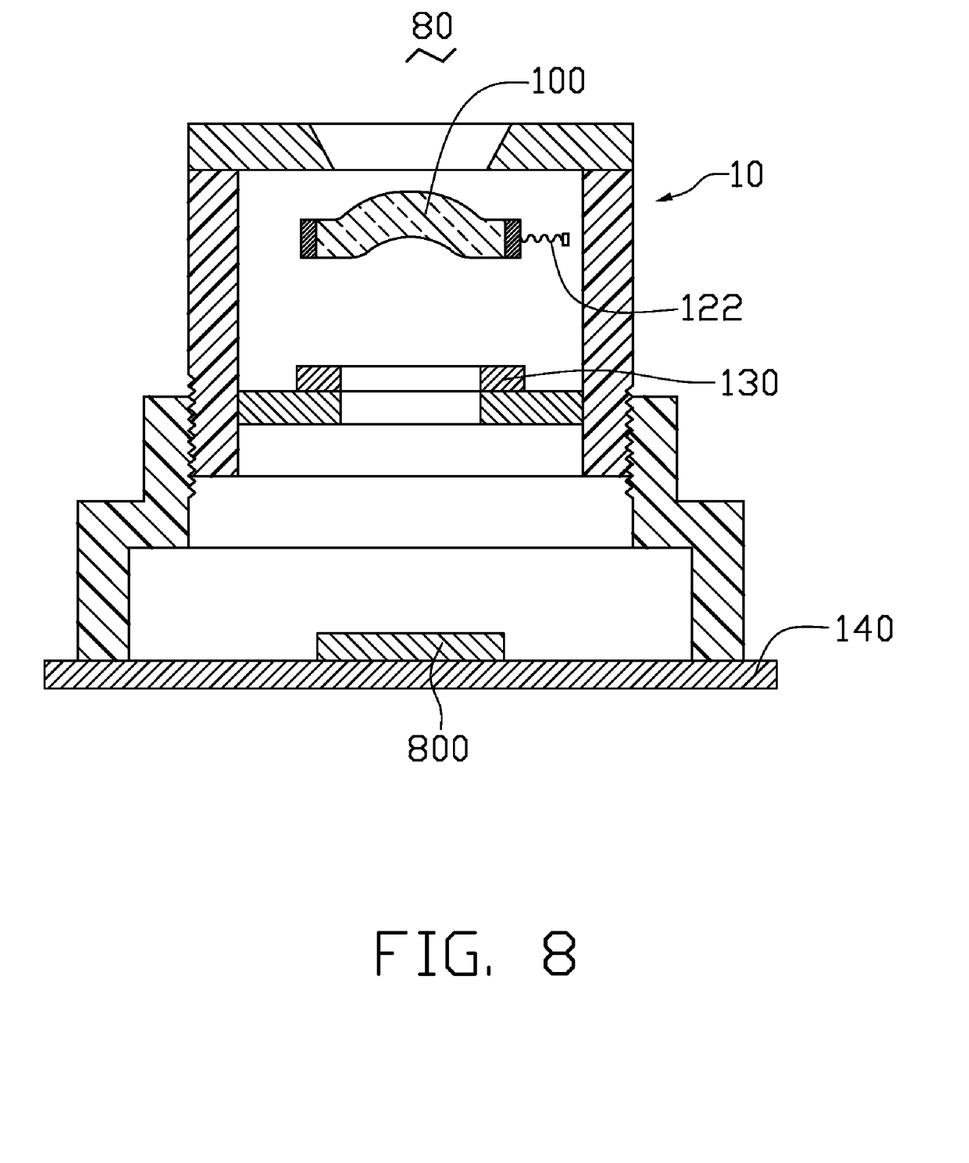
FIG. 8 is a schematic, side cross-sectional view of a camera module, according to a third embodiment.

Referring to FIG. 8, a camera module 80 of a third embodiment is shown. The camera module 80 includes a lens module 10 of the first embodiment and an image sensor 800. The image sensor 800 is electrically connected with the circuit board 140 and optically aligns with the lens 100. A movement of the coil 122 is precisely controlled by the voltages applied to the coil 122 and the magnet 130. So a distance between the image sensor 800 and the lens 100 is precisely controlled to achieve auto-focusing of the camera module 80.

Figure 9:
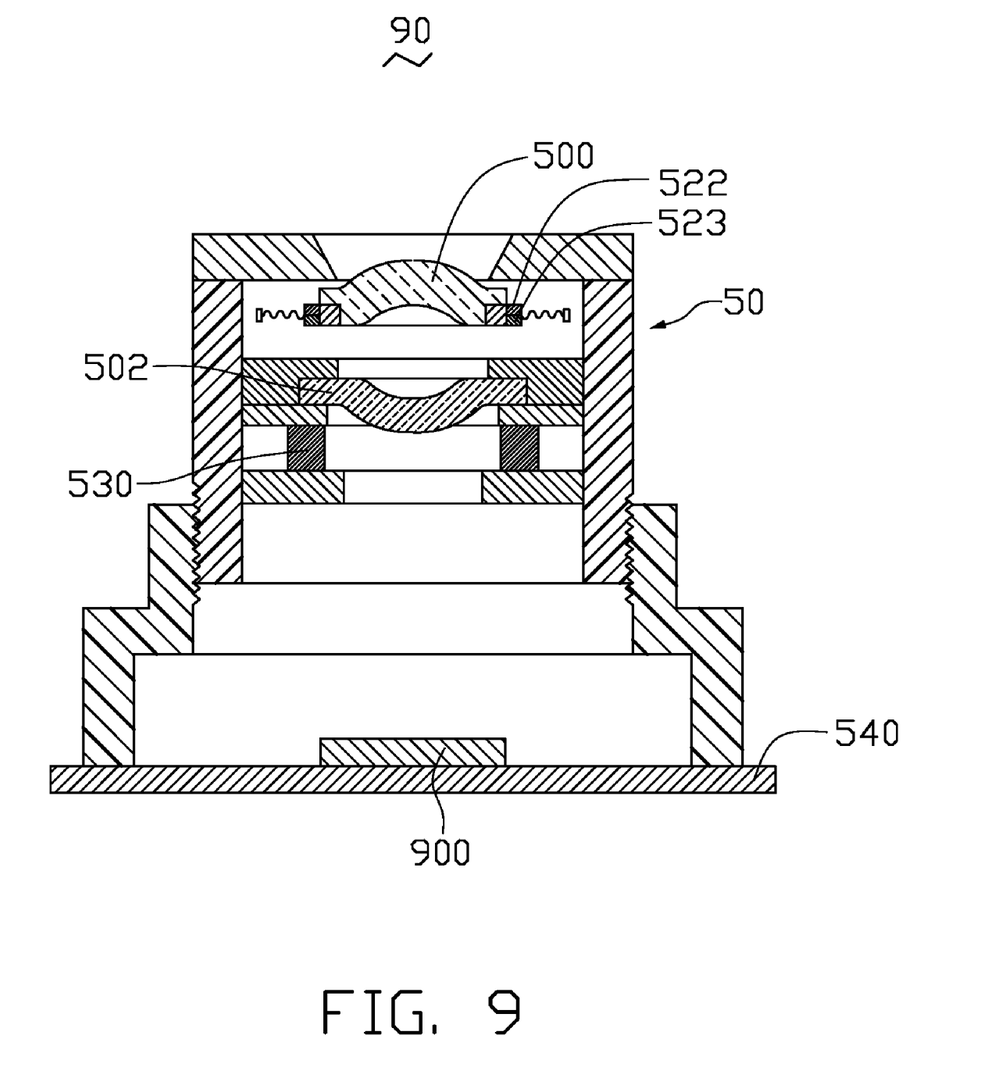
FIG. 9 is a schematic, side cross-sectional view of a lens module, according to a fourth embodiment.

Referring to FIG. 9, a camera module 90 of a fourth embodiment is shown. The camera module 90 includes a lens module 50 of the second embodiment and an image sensor 900. The image sensor 900 is electrically connected to the circuit board 540 and optically aligns with the first lens 500 and the second lens 502. The movements of the first coil 522 and the second coil 523 are precisely controlled by the voltages applied thereto. A distance between the first lens 500 and the second lens 502 is precisely controlled to achieve zooming of the camera module 90.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope of the appended claims.

What is claimed is:

1. A lens module comprising:
a barrel;
a lens received in the barrel, the lens having an optical axis;
a movable coil unit received in the barrel and comprising a first coil wound around a peripheral sidewall of the lens in a first winding direction, a second coil wound around the peripheral sidewall of the lens in a second winding direction, opposite to the first winding direction viewed from the first ends of the resilient elements to the second ends of the resilient elements, and a plurality of resilient elements arranged along directions perpendicular to the optical axis, the plurality of resilient elements comprising two first electrically conductive resilient elements and two second electrically conductive resilient elements, each of the resilient elements comprising a first end connected to the first coil and a second end coupled to an inner surface of the barrel, wherein two ends of the first coil are connected to the respective first ends of the first electrically conductive resilient elements, such that the first coil is electrically powered through the first electrically conductive resilient elements and thus is capable of generating a first magnetic field in a first direction along the optical axis; and two ends of the second coil are connected to the respective first ends of the second electrically conductive resilient elements, such that the second coil is electrically powered through the second electrically conductive resilient elements and thus is capable of generating a third magnetic field in a third direction which is opposite to the first direction; one of the first coil and the second coil are selectively electrically powered; and
a magnet received in the barrel and facing toward the first coil, the magnet generating a second magnetic field in a second direction along the optical axis, wherein when the second direction is the same as the first direction or opposite to the third direction, the first coil together with the lens is driven to move away from the magnet along the optical axis, and when the second direction is opposite to the first direction or the same as the third direction, the first coil together with the lens is driven to move toward the magnet along the optical axis.

2. The lens module as claimed in claim 1, further comprising a metal ring mounted to the peripheral sidewall of the lens, and the first coil and the second coil are wound at the metal ring.

3. A camera module comprising:
a barrel;
a lens received in the barrel, the lens having an optical axis;
a movable coil unit received in the barrel and comprising a first coil wound around a peripheral sidewall of the lens in a first winding direction, a second coil wound around the peripheral sidewall of the lens in a second winding direction, opposite to the first winding direction viewed from the first ends of the resilient elements to the second ends of the resilient elements, and a plurality of resilient elements arranged along directions perpendicular to the optical axis, the plurality of resilient elements comprising two first electrically conductive resilient elements and two second electrically conductive resilient elements, each of the resilient elements comprising a first end connected to the first coil and a second end coupled to an inner surface of the barrel, wherein two ends of the first coil are connected to the respective first ends of the first electrically conductive resilient elements, such that the first coil is electrically powered through the first electrically conductive resilient elements and thus is capable of generating a first magnetic field in a first direction along the optical axis; and two ends of the second coil are connected to the respective first ends of the second electrically conductive resilient elements, such that the second coil is electrically powered through the second electrically conductive resilient elements and thus is capable of generating a third magnetic field in a third direction which is opposite to the first direction; one of the first coil and the second coil are selectively electrically powered; and
a magnet received in the barrel and facing toward the first coil, the magnet generating a second magnetic field in a second direction along the optical axis, wherein when the second direction is the same as the first direction or opposite to the third direction, the first coil together with the lens is driven to move away from the magnet along the optical axis, and when the second direction is opposite to the first direction or the same as the third direction, the first coil together with the lens is driven to move toward the magnet along the optical axis;
a holder threadedly engaged with the barrel; and
an image sensor accommodated in the holder and optically aligned with the first lens.

4. The camera module as claimed in claim 3, further comprising a metal ring mounted to the peripheral sidewall of the lens, and the first coil and the second coil are wound at the metal ring.

* * * * *